(12) United States Patent
Brower et al.

(10) Patent No.: US 7,512,283 B2
(45) Date of Patent: *Mar. 31, 2009

(54) METHOD OF TRANSMITTING SELECTED REGIONS OF INTEREST OF DIGITAL VIDEO DATA AT SELECTED RESOLUTIONS

(75) Inventors: Bernard V. Brower, Webster, NY (US); Sreekanth D. Rajan, Herndon, VA (US); Eli J. Glaser, Alexandria, VA (US); Derrick S. Campbell, Rochester, NY (US); Dale F. McIntyre, Honeoye Falls, NY (US); Matthew C. Severski, Fairport, NY (US)

(73) Assignee: Eastman Kodak Company, Rochester, NY (US)

( * ) Notice: Subject to any disclaimer, the term of this patent is extended or adjusted under 35 U.S.C. 154(b) by 162 days.

This patent is subject to a terminal disclaimer.

(21) Appl. No.: 11/451,030

(22) Filed: Jun. 12, 2006

(65) Prior Publication Data

US 2006/0239574 A1  Oct. 26, 2006

Related U.S. Application Data

(63) Continuation of application No. 10/328,321, filed on Dec. 23, 2002, now Pat. No. 7,116,833.

(51) Int. Cl.
*G06K 9/36* (2006.01)
(52) U.S. Cl. ...................... 382/240; 382/232
(58) Field of Classification Search .............. 382/180, 382/232, 233, 239, 240; 358/426.11; 709/231, 709/247; 375/240.19; 345/660
See application file for complete search history.

(56) References Cited

U.S. PATENT DOCUMENTS

| 5,710,835 | A | * | 1/1998 | Bradley | 382/233 |
| 5,768,535 | A | | 6/1998 | Chaddha et al. | 709/247 |
| 5,880,856 | A | | 3/1999 | Ferriere | 358/426.11 |
| 5,953,506 | A | | 9/1999 | Kalra et al. | 709/231 |
| 6,026,183 | A | * | 2/2000 | Talluri et al. | 382/194 |
| 6,067,383 | A | * | 5/2000 | Taniguchi et al. | 382/240 |
| 6,101,265 | A | | 8/2000 | Bacus | 382/133 |

(Continued)

FOREIGN PATENT DOCUMENTS

EP         0449529 B1     2/1997

(Continued)

*Primary Examiner*—Duy M Dang
(74) *Attorney, Agent, or Firm*—Stephen H. Shaw (57) ABSTRACT

A method of transmitting selected regions of interest of digital video data at selected resolutions, including: capturing digital video; compressing the digital video into a sequence of individual high resolution JPEG 2000 frames and simultaneously extracting from the compressed high resolution JPEG 2000 frames a lower resolution; storing the individual high resolution JPEG 2000 frames in a storage device; creating a video sequence of the lower resolution representation; transmitting the video sequence of the lower resolution representation to a user; creating one or more video sequences of selected regions of interest at selected resolutions greater than the resolution of the video sequence of the lower resolution representation; transmitting one or more video sequences of selected regions of interest at selected resolutions; and repeating the prior two steps at incrementally increased resolutions until a desired resolution of the selected region of interest is reached according to a viewing objective.

29 Claims, 10 Drawing Sheets

U.S. PATENT DOCUMENTS

| | | | |
|---|---|---|---|
| 6,281,874 B1 | 8/2001 | Sivan et al. | 345/660 |
| 6,987,890 B2 * | 1/2006 | Joshi et al. | 382/240 |
| 7,116,833 B2 * | 10/2006 | Brower et al. | 382/240 |
| 2002/0051583 A1 | 5/2002 | Brown et al. | 382/299 |

FOREIGN PATENT DOCUMENTS

| | | |
|---|---|---|
| GB | 2331654 A | 1/1998 |
| GB | 2331645 A | 5/1999 |
| WO | 90/013966 | 11/1990 |
| WO | 96/029818 | 3/1996 |
| WO | 00/049571 | 8/2000 |
| WO | 00/065838 | 11/2000 |

\* cited by examiner

METHOD OF TRANSMITTING SELECTED REGIONS OF INTEREST OF DIGITAL VIDEO DATA AT SELECTED RESOLUTIONS

CROSS-REFERENCE TO RELATED APPLICATIONS

This is a continuation of Ser. No. 10/328,321, filed on Dec. 23, 2002 now U.S. Pat. No. 7,116,833 by Bernard V. Brower et al., and entitled "Method of Transmitting Selected Regions of Interest of Digital Video Data at Selected Resolutions," wherein this prior application is incorporated by reference herein.

FIELD OF THE INVENTION

The present invention relates generally to the field of digital image exploitation and transmission, and specifically to the use of wavelet compressed images combined with digital motion video in the delivery of digital imagery. Image data is optimized for transmission across varying and sometimes limited bandwidths as well as towards the user's specified regions of interest within the imagery.

BACKGROUND OF THE INVENTION

Digital imagery has been shown to contain a great deal of useful information that can be utilized in many disparate applications. The challenge has been to provide a way to deliver this wealth of digital image information to an end user in an effective, efficient, and practical manner; one that meets the user's needs and objectives with as little excess data as possible. Digital imagery, both still and motion, includes a great deal of information since each picture element (or pixel) comprising the image must eventually be individually represented to the end user through the display device as a color, and as many as 16 million possible colors (or more) are required for a true to life, full color image. The volume of information required to digitally represent a true to life image can become staggeringly large; so large that manipulation of such images on digital devices, such as computers can become impractical. Transmission of these images between devices becomes even more problematic given the generally limited bandwidth of common transmission methods. Aggravating this issue is the fact that in many cases only a part of the image, sometimes a very small part, contains information that is of interest and value to the end user. Much of the source image is unneeded and/or distracting, taking up valuable transmission bandwidth and complicating the user's interaction with and analysis of the image and of the information held within. Digital image delivery and exploitation is, therefore, hindered by the sheer bulk of the information involved.

In most cases, these problems are addressed by reducing the size of the digital image—a process called image compression. Image compression reduces the size of the data required to store the image. With digital video, compression of the individual digital image frames is usually coupled with some type of frame-to-frame processing and potentially a reduction in frame rate. No matter what the specific technique, the end result is to reduce the amount of data required to represent the image(s), thus enabling faster transmission and frequently faster processing.

Many image and video compression techniques are commonly found in the art, such as the Joint Photographic Experts Group (JPEG) ISO standard 10918 for still images and the Moving Pictures Experts Group (MPEG) for motion video images, which reduces image data size to facilitate transmission through limited bandwidth connections. Using such compression techniques, digital still and motion video can be manipulated, transmitted across networks, and displayed to an end user in a usable and somewhat effective manner.

However, many limitations and constraints can be found in such systems. Imagery that is delivered to the user across a given connection is limited to a single resolution at a time, although additional requests from the user might cause a new transmission at some new resolution. Storage formats limit each image file to storing only a single resolution, though multiple files may be used to store multiple resolutions of the same source image. Images are transmitted and stored in their entirety, regardless of whether the user or application requesting the image needs the entire image or only a limited region of interest. User interaction with the image information stream is limited to selecting which images are to be transmitted. Even when an image is displayed to the user and zoomed in to a subset area of the same image, the entire image must be transmitted to the user.

On a fundamental level, all such compression methods address only one of the problems found in digital imagery—the size of the images themselves. Although such reductions do greatly alleviate the difficulties of dealing with digital imagery, they offer no way to extract from the imagery only the portions that the user ultimately wants to see. Compression, by itself, will result in a smaller representation of essentially the same data set, and not extraction of the useful regions of interest from the data set.

Prior art does exist that addresses some of these issues. In U.S. Pat. No. 5,768,535 issued Jun. 16, 1998 to Navin Chaddha, et al., and titled "Software-Based Encoder For A Software-Implemented End-To-End Scalable Video Delivery System," a system is presented that provides a continuous stream of image data from a server (encoder) to clients (decoders), allowing each client side decoder to extract only the resolution(s) applicable to the user. The server in this case streams all resolutions to the clients and allows the clients to process only the desired resolution(s). Within the server's data stream, clients drop packets in response to limited transmission bandwidth. No provision is made for selective transmission from the server to the clients of only a region of interest from the source imagery; nor is there any method described by which a client can specify and request high resolution still frames of individual video frames. The client/server model in this system provides little interaction between the user and the server (outside of initiating and regulating the transmission stream) since the client side decoder is the component that extracts the desired data from the server stream.

U.S. Pat. No. 6,281,874 issued Aug. 28, 2001 to Zohar Sivan, et al., and titled "Method And System For Downloading Graphic Images On The Internet" describes a system in which low resolution still images are first transmitted to the client who then selects on the image a region of interest which is then sent to the client as a high resolution image. This system reduces network bandwidth demands and delivers high resolution information for the area of interest. However, it deals exclusively with still images and does not utilize any progressive resolution display. Furthermore, no image analysis is described for the discovery of image components that might aid in the identification of regions of interest, nor is any client control over the delivered resolution(s) described.

Some of the limitations are inherent to the particular image compression and storage formats. A relatively new image format put forth by the Joint Photographic Experts Group called JPEG 2000 addresses many of these storage and transmission limitations. JPEG 2000 images are stored in a wavelet compressed representation that includes multiple resolutions within a single data stream, allows for extraction of only a specified region of the image, and allows for the embedding of non-image information. The multiple resolutions are represented by a data code stream in which the data for a base, low resolution image can be streamed first, followed by data that enhances the base resolution image to increasingly higher levels of resolution. This data code stream can also be trimmed to include only the data representing a region of interest comprised of a subset of the entire image. An additional JPEG standard, the JPEG 2000 Internet Protocol (JPIP), couples the JPEG 2000 standard with a transmission protocol that permits the JPEG 2000 capabilities to be experienced across a standard transmission protocol.

Although relatively new, JPEG 2000 technologies and standards can be commonly found in the art. Said technologies do offer the JPEG 2000 advantages of multiple, selectable resolutions and selectable regions of interest. In U.S. Patent Publication No. 2002/0051583 A1, by Craig Matthew Brown, et al., published May 2, 2002, and titled "Image Transfer Optimisation," a system is described in which multiple resolutions of wavelet based (i.e. JPEG 2000) images are transmitted to a user in an optimized manner. Furthermore, the system provides for the specification of a region of interest and the selective transmission of only that region's information to the user. However, only still frame images are described, both as the low resolution "thumbnail" initial representation, and as the higher resolution delivered image. No provision is made for utilizing video representations, at any resolution or of any portion of the source images, in the presentation of the image data or selection of the region of interest. Additionally, no provisions are described for region of interest selection based upon automated feature recognition or other image analysis methods.

In the World Intellectual Property Organization international publication number WO 00/65838 by Tony Richard King, et al., published Nov. 2, 2000 titled "Conversion Of A Media File Into A Scalable Format For Progressive Transmission," a system is described wherein multiple source image formats are converted to a universal layered file format, supporting incremental resolution transmission, as well as selection and transmission of regions of interest. Although motion video formats such as MPEG are addressed, the focus of the system is towards the creation of a generalized bit stream transmission that can be decoded by generalized tools regardless of the original image format. This system does not utilize low resolution motion video imagery in the selection of higher resolution motion and still imagery, nor does it specify a method of delivering high resolution still images based upon selections made against low resolution motion video.

In the World Intellectual Property Organization international publication number WO 00/49571 by Meng Wang, et al., published Aug. 24, 2000, and titled "Method and system Of Region-Based Image Coding With Dynamic Streaming Of Code Blocks," methods are presented for encoding JPEG 2000 images such that regions of interest can be efficiently specified and transmitted. The methods apply to the creation and storage of JPEG 2000 images and as such are focused on only a small part of the present invention. No provisions are made for the selection of regions of interest and/or resolutions based upon the content of low resolution motion video.

All such prior art focuses on the presentation of existing, static imagery to multiple users in an efficient or bandwidth-optimized fashion. Although the amount of binary information that is transmitted is reduced, no attempt is made to reduce the amount of visual information to which the user is exposed and which the user must analyze. Region of interest and image resolution selections are limited to a few predetermined ranges, mostly as a reflection of the static nature of the source imagery. In the prior art, the user interaction with the imagery is minimal at best and the user is forced into limited image choices.

Real users typically utilize digital imagery in the context of some objective—some condition the user wishes to detect or monitor. Objectives generally are the visual observation of some scene, detection of specific changes and/or objects in that scene, visual analysis of the parts of the scene that contain the changes and/or objects, and the arrival at some decision or determination regarding those changes and/or objects in particular and regarding the scene in general. Only portions of the complete imagery will typically contain information that is useful within the context of a given objective and resolutions less than the source's true resolution will typically be sufficient to achieve such objectives. As one visually analyzes a scene, a user might want to get a higher resolution view of part of an image which they would then further analyze; deciding at times that an even higher resolution view of part of the image is required, while at other times being able to reach their objective concerning the scene with the already delivered imagery. By interacting with the delivered imagery, a user would be able to select areas upon which they wish to focus their attention, further refine those areas, make decisions or determinations, and then move to other parts of the image holding information of interest.

No prior art allows a user to get just enough information in the form of digital imagery for the user to satisfy such objectives. No prior art allows a user to perform a repeated, iterative selection of image areas and resolutions in search of just enough information to make a decision. No prior art allows for imagery to be analyzed before being sent so that only imagery containing information of interest to the user need be transmitted. These capabilities remain unavailable to users today. Furthermore, no prior system provides for the delivery to an end user of high resolution JPEG 2000 images of a region selected from a video sequence, at selected resolutions.

SUMMARY OF THE INVENTION

The present invention is directed to overcoming one or more of the problems set forth above. Briefly summarized, according to one aspect of the present invention, is a method of transmitting selected regions of interest of digital video data at selected resolutions, including the steps of capturing digital video; and compressing the digital video into a sequence of individual high resolution JPEG 2000 frames and simultaneously extracting from the compressed high resolution JPEG 2000 frames a lower resolution representation of each of the individual high resolution JPEG 2000 frames. Subsequently, storing the individual high resolution JPEG 2000 frames in a storage device; creating a video sequence of the lower resolution representation of each of the stored individual high resolution JPEG 2000 frames; and transmitting the video sequence of the lower resolution representation of each of the stored individual high resolution JPEG 2000 frames to a user. Next, one creates one or more video sequences of selected regions of interest at selected resolutions greater than the resolution of the video sequence of the lower resolution representation; transmitting one or more video sequences of selected regions of interest at selected resolutions; and repeating the steps of creating and transmitting one or more video sequences of selected regions of interest at incrementally increased resolutions until a desired resolution of the selected region of interest is reached according to a viewing objective.

ADVANTAGES

The present invention provides for a user to get just enough information in the form of digital imagery for the user to satisfy viewing objectives. The present invention allows a user to perform a repeated, iterative selection of image areas and resolutions in search of just enough information to make a decision. Often, digital imagery carries little or no value until some type of alert condition is reached wherein information becomes available that has an impact on a user objective. In such cases, the imagery need not be transmitted to the user until such alert conditions do exist in the imagery. Additionally, as a result of the present invention, one can analyze imagery before it is transmitted, so that only imagery containing information of interest to the user is transmitted. Furthermore, the present invention provides for the delivery to an end user of high resolution JPEG 2000 images of a region, selected from a video sequence, at selected resolutions.

BRIEF DESCRIPTION OF THE DRAWINGS

The above features and advantages of the present invention will become more apparent when taken in conjunction with the following description and drawings wherein identical reference numerals have been used, where possible, to designate identical features that are common to the figures, and wherein:

FIG. 6a is a flow chart of the operation of the subsystem of FIG. 5a;

DETAILED DESCRIPTION OF THE INVENTION

Figure 1:
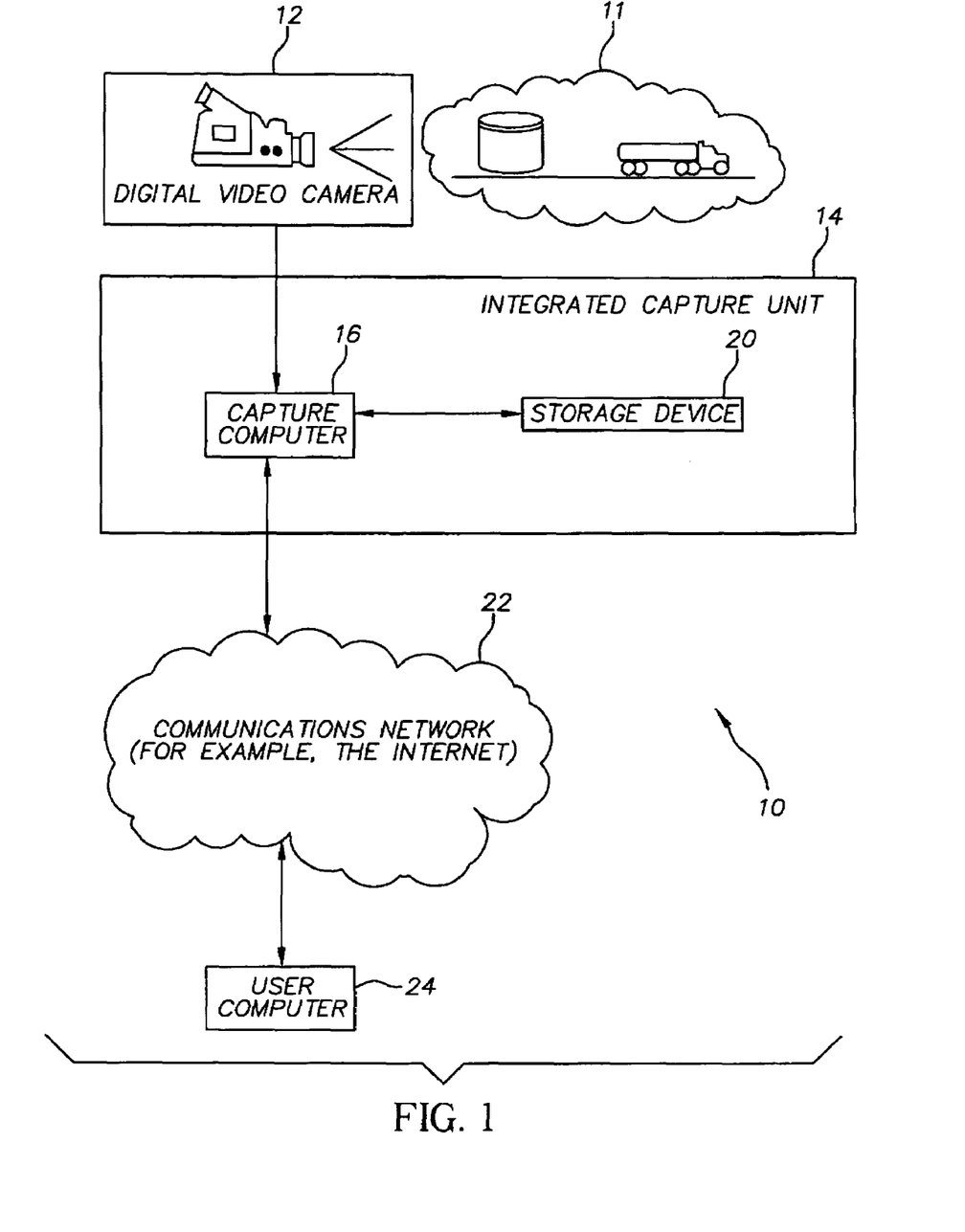
FIG. 1 is a system diagram of a preferred embodiment.

FIG. 1 is a system diagram in accordance with the present invention. A selective digital video transmission system 10 is shown that includes a digital video camera 12, an example of which is the KODAK™ ES 1.0 Megapixel camera™. The digital video camera 12 captures digital video of a captured scene 11 and outputs that digital video to a capture computer 16. Digital video camera 12 communicates with capture computer 16 via a direct connection, using standard techniques as found in the art. Direct connections include, but are not limited to, Universal Serial Bus (USB)™, Firewire™, or other well known standard, serial, or parallel interfaces, whether connected with a cable or with a wireless interface, such as a Bluetooth™ connection. Capture computer 16 compresses the digital video and stores it on storage device 20, which is connected to capture computer 16 via any of the conventional and widely known high-speed connections. Storage device 20 can be a variety of devices well known in the art, such as, but not limited to, a rotating magnetic disk drive or an optical disk drive. Capture computer 16 and storage device 20 are housed together as an integrated capture unit 14, which in one embodiment is a portable device capable of being carried by a person. A communications network 22, such as a local area network (LAN), a Wide Area Network (WAN), a satellite network (like those commonly found in use by many government agencies), or the Internet, connects capture computer 16 to a user computer 24. Two present day examples of satellite networks that provide internet or data connection via satellite are: VisionConsult™ and Globalstar™. User computer 24 displays the video and still imagery delivered by capture computer 16 across communications network 22, and may transmit requests to capture computer 16 across that same network or another such network. Multiple communications networks 22, of consistent or varying types, each connected to one or more user computers 24, may also be connected to capture computer 16.

In another embodiment, integrated capture unit 14 is a fixed position device located, for example, in a building or other structure. In this embodiment, capture computer 16 may or may not utilize other computers to perform some of the processing tasks. Any such additional computers are connected to each other and/or capture computer 16 by a high-speed network such as a Local Area Network (LAN) Fast Ethernet network. Furthermore, processing of output from digital video camera 12 by capture computer 16 can be configured to trigger an alert to the user or users when a specified image condition is detected such as activity in certain areas of the image, specific image patterns, and/or recognized objects in the image. A more detailed description of this capability is given with respect to FIG. 4 and its related text.

Figure 2:
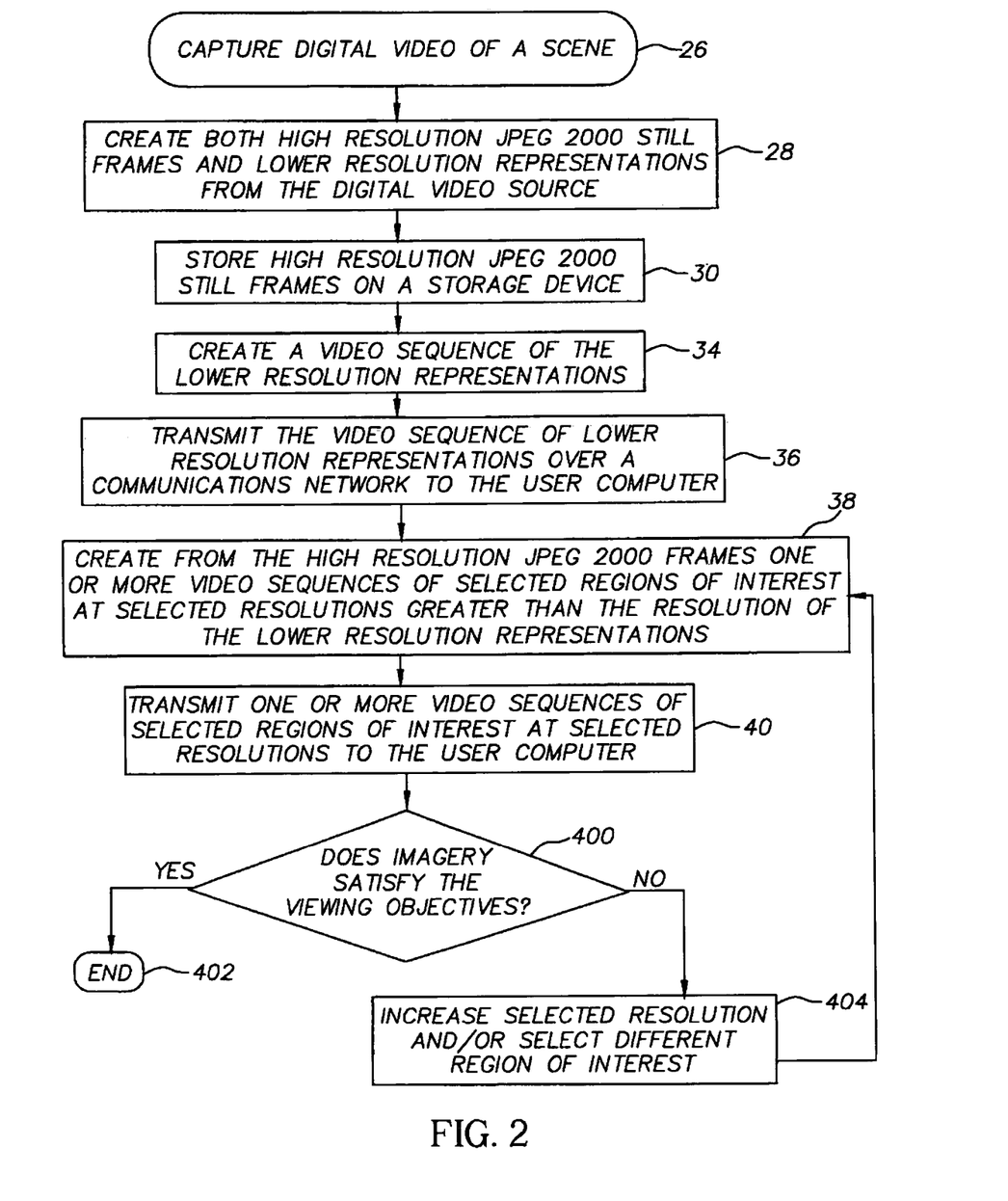
FIG. 2 is a flow chart of the operation of the system of FIG. 1.

Referring to FIG. 2, a flow chart illustrates the operation of the selective digital video transmission system 10, as shown earlier in FIG. 1. Beginning with step 26, digital video is captured by digital video camera 12 and delivered to capture computer 16. In step 28, the digital video from digital video camera 12 is processed into both high resolution Joint Photographic Experts Group (JPEG) 2000 still frames and a lower resolution representation of each JPEG 2000 still frame. Details of this step are given in figures FIGS. 5a-5c and FIGS. 6a-6c and the associated text. These high resolution JPEG2000 still frames are then stored (step 30) in storage device 20. A video sequence of the lower resolution representations is created in step 34 using any of the streaming digital video formats and techniques commonly known in the art, such as any of the Moving Pictures Expert Group (MPEG) standards video coding, or Motion JPEG 2000 standards; and transmitted in step 36 as streaming video to user computer 24 over communications network 22. User computer 24 displays the lower resolution video sequence to the user. Steps 26 through 36 are repeated until step 26 is terminated, while the remaining steps occur in parallel. In step 388, one or more video sequences of selected regions of interest (selection described below) at selected resolutions (selection described below) greater than the resolution of the video sequence of the lower resolution representations are created by capture computer 16 from the high resolution JPEG 2000 frames. One or more of these video sequences of selected regions of interest at selected resolutions are transmitted in step 40 to user computer 24 across communications network 22. User computer 24 displays the video sequence of selected regions of interest at selected resolutions to the user, who then in step 400 evaluates the delivered imagery in the context of a viewing objective. Such viewing objectives are defined by the purpose or task the user is attempting to perform, such as identification of dangerous conditions, military or civil threats, changes in status of any material and/or personnel asset, or any visually detectable condition in captured scene 11. If the imagery is insufficient to satisfy the viewing objective(s), or new viewing objectives are identified, step 404 is utilized to select a new region of interest and/or a new higher resolution, and subsequent processing continues with step 38. If the imagery is sufficient to satisfy the objective(s) and no new objectives are identified, the processing will end in step 402 and all steps are terminated.

Regions of interest can be automatically selected in a variety of ways including object recognition, change detection, edge detection, and detail detection. For example, capture computer 16 processes the high resolution JPEG 2000 still frames and selects image elements corresponding to specific feature types, such as fuel depots, aircraft, landing fields, and vehicles (i.e., object recognition). Capture computer 16 may also process the high resolution JPEG 2000 frames in sequence and select areas of the images that are changing (i.e., change detection), or capture computer 16 processes the high resolution JPEG 2000 frames and selects areas in the image with a lateral displacement of high frequency edges (i.e., edge detection). Additionally, capture computer 16 processes the high resolution JPEG 2000 frames and selects areas of the image with high levels of detail (i.e., detail detection).

Notwithstanding automatic selection of the regions of interest, the user can select regions of interest in many different ways such as: a) using a mouse or other pointing devices, or a keyboard communicating with user computer 24 to select a point or area on the image display using any of the techniques widely known in the art; b) selecting from a list of suggested regions of interest as determined by any of the automated techniques listed above (object recognition, change detection, edge detection, detail detection); c) specifying a color that is found predominantly in the desired region of interest; d) using a voice command interface in combination with any other selection methods, including those described herein, using techniques widely known in the art; or e) any other selection technique widely known in the art.

Different resolutions are incrementally selected by the user by factors of two using any of the user interface input techniques commonly found in the art such as a pull down list, "plus" and "minus" buttons, scroll bars, and slider controls. Any input device, in combination or alone, such as a mouse, another pointing device, a keyboard, or voice recognition can be used by the user to interact with the aforementioned user interface objects.

Figure 3:
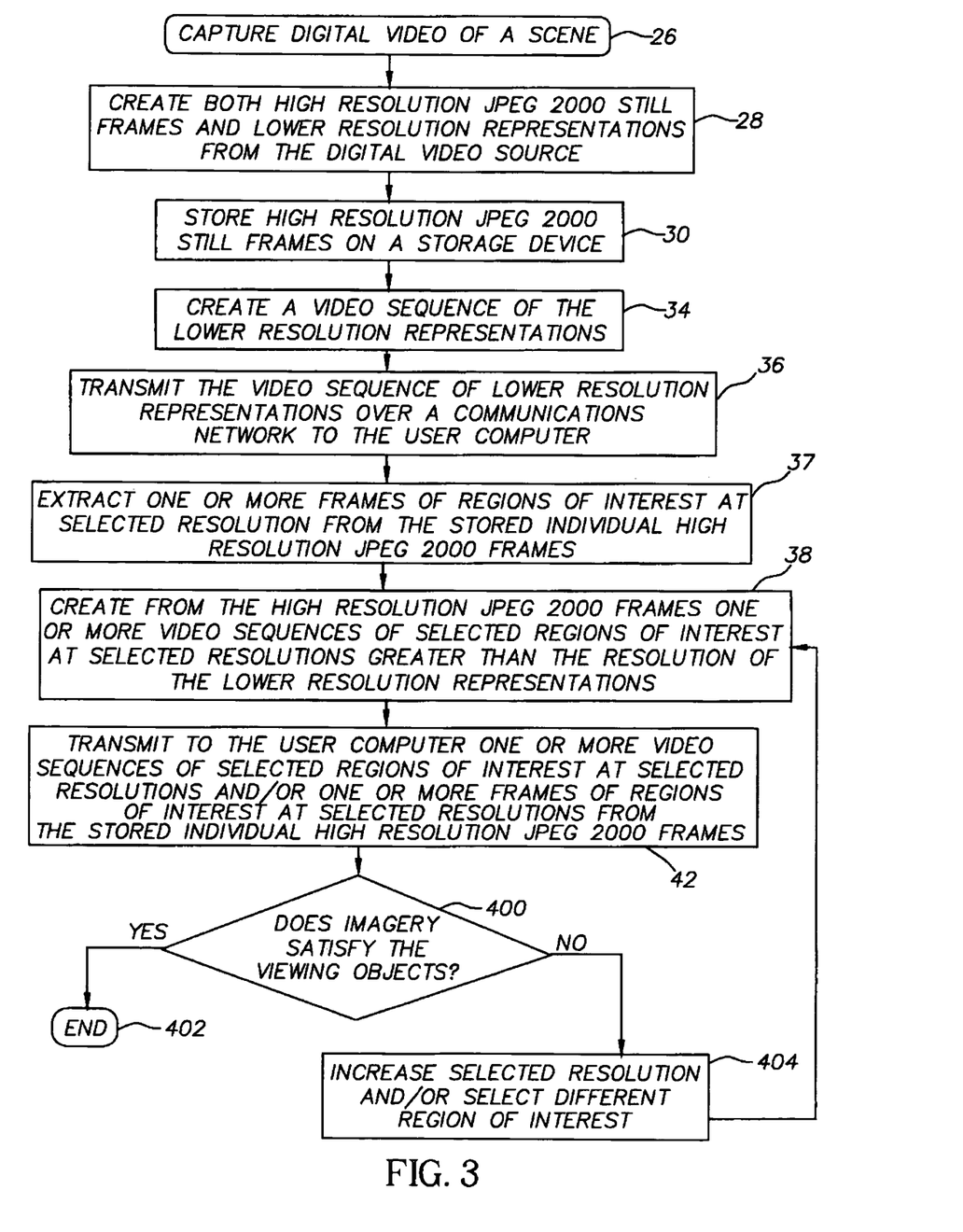
FIG. 3 is a flow chart of an alternate operation of the system of FIG. 1.

FIG. 3 is a flow chart in accordance with the present invention and substantially similar to FIG. 2, sharing several steps of identical or like nature. Steps 26, 28, 30, 34, 36, and 38 are identical to the same labeled steps from FIG. 2. In step 37, one or more regions of interest at selected resolutions are extracted as still frames by capture computer 16 from the individual JPEG 2000 frames, the format of which may be any image format, including JPEG 2000. One or more of the video sequences from step 38, and/or one or more still frames from step 37 are transmitted in step 42 to user computer 24 across communications network 22. The user will specify which video sequences (step 38) and/or still frames (step 37) are to be transmitted using user interface techniques commonly found in the art. Multiple specified image content sources will be transmitted using any of the simultaneous multiple network transmission techniques commonly found in the art such as multiple browser connections, multiple browser windows, JPEG internet protocol (JPIP), or any such well known method. User computer 24 displays the video sequence of selected regions of interest at selected resolutions and/or the still frames of selected regions of interest at selected resolutions to the user. As described above for FIG. 2, the user evaluates the imagery in step 400 wherein the imagery may now include video sequences and/or still frames. Based upon that evaluation (step 400), processing ends with step 402 (as in FIG. 2) or continues with step 404 (as in FIG. 2) followed by step 37 (new to FIG. 3). Also as described above for FIG. 2, the region of interest may be selected either automatically or by the user using a variety of methods.

Figure 4:
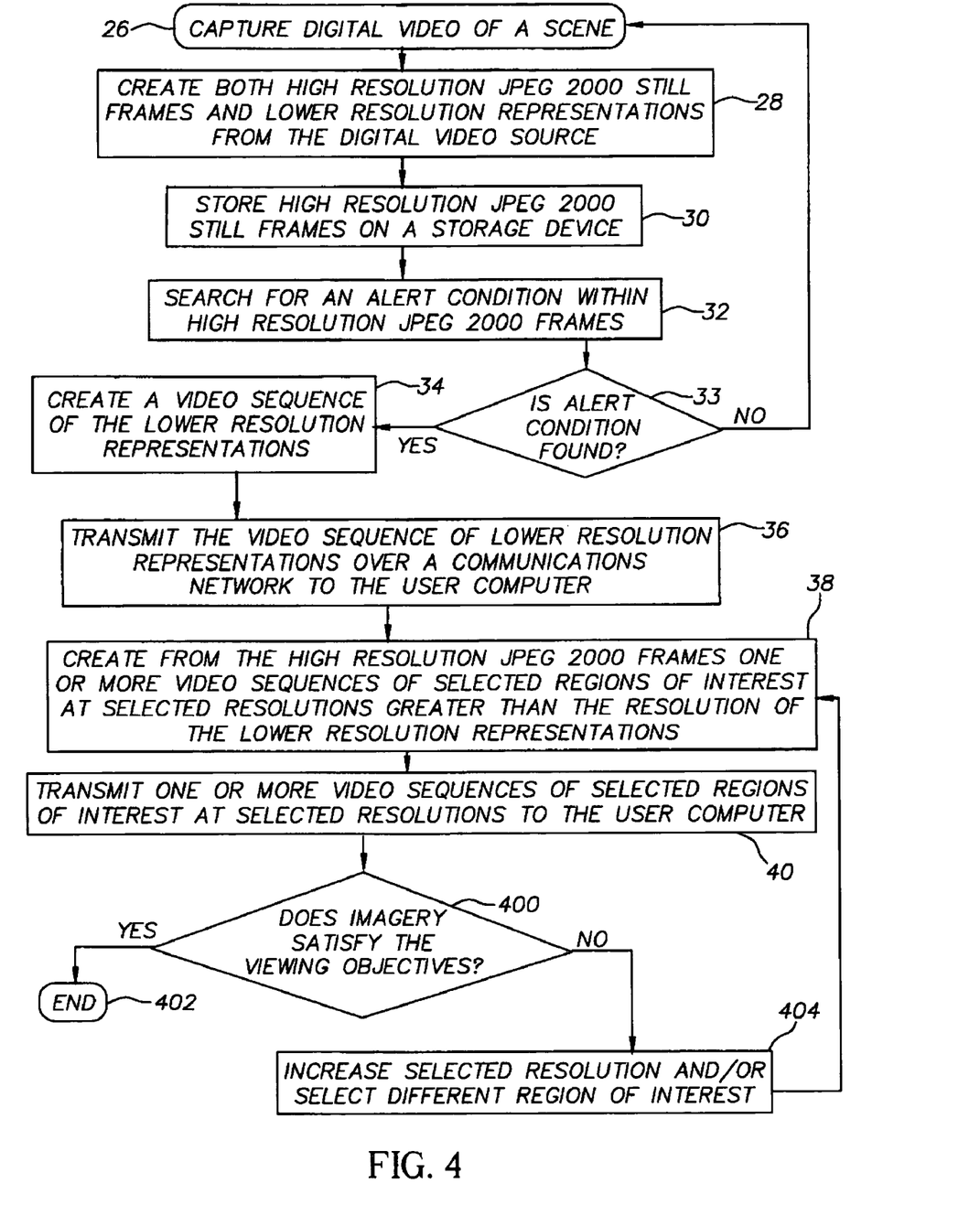
FIG. 4 is a flow chart of an alternate operation of the system of FIG. 1 wherein the system searches for alert conditions.

FIG. 4 is a flow chart in accordance with the present invention and substantially similar to FIG. 2, sharing several steps of identical or like nature. Steps 26, 28, and 30 are identical to the same labeled steps from FIG. 2. In step 32 capture computer 16 begins continuous analysis of the JPEG 2000 high resolution images that are continuously generated in step 28 from the captured digital video in search of alert conditions within the region of interest. The region of interest may be specified by the user as described above for FIG. 2 or selected automatically using any of the automated methods also described above for FIG. 2. Alert conditions may be any detectable change in the image including movement of recognized objects, changes in edges, changes in image detail, and/or gain or loss of specific colors and may be specified by the user using any interface method that is well known in the art. In step 33 the analysis process from step 32 on capture computer 16 detects an alert condition within the area of interest and control is passed on to step 34, after which processing proceeds as in FIG. 2 with steps 34, 38, 40, 400, 402, and 404 being identical in nature to the same labeled steps in FIG. 2. In step 36, in addition to the actions described for the same labeled step in FIG. 2, capture computer 16 may also transmit an alert to user computer 24 using communications network 22, at which time user computer 24 notifies the end user by sound, visual display, or any attention attracting means as is commonly found in the art. The user, upon discovery of the alert, could begin operation of selective digital video transmission system 10 either as described for FIG. 2 or as for FIG. 3 using the analyzed region of interest in which the alarm condition was detected as the initially selected region of interest.

Figure 5A:
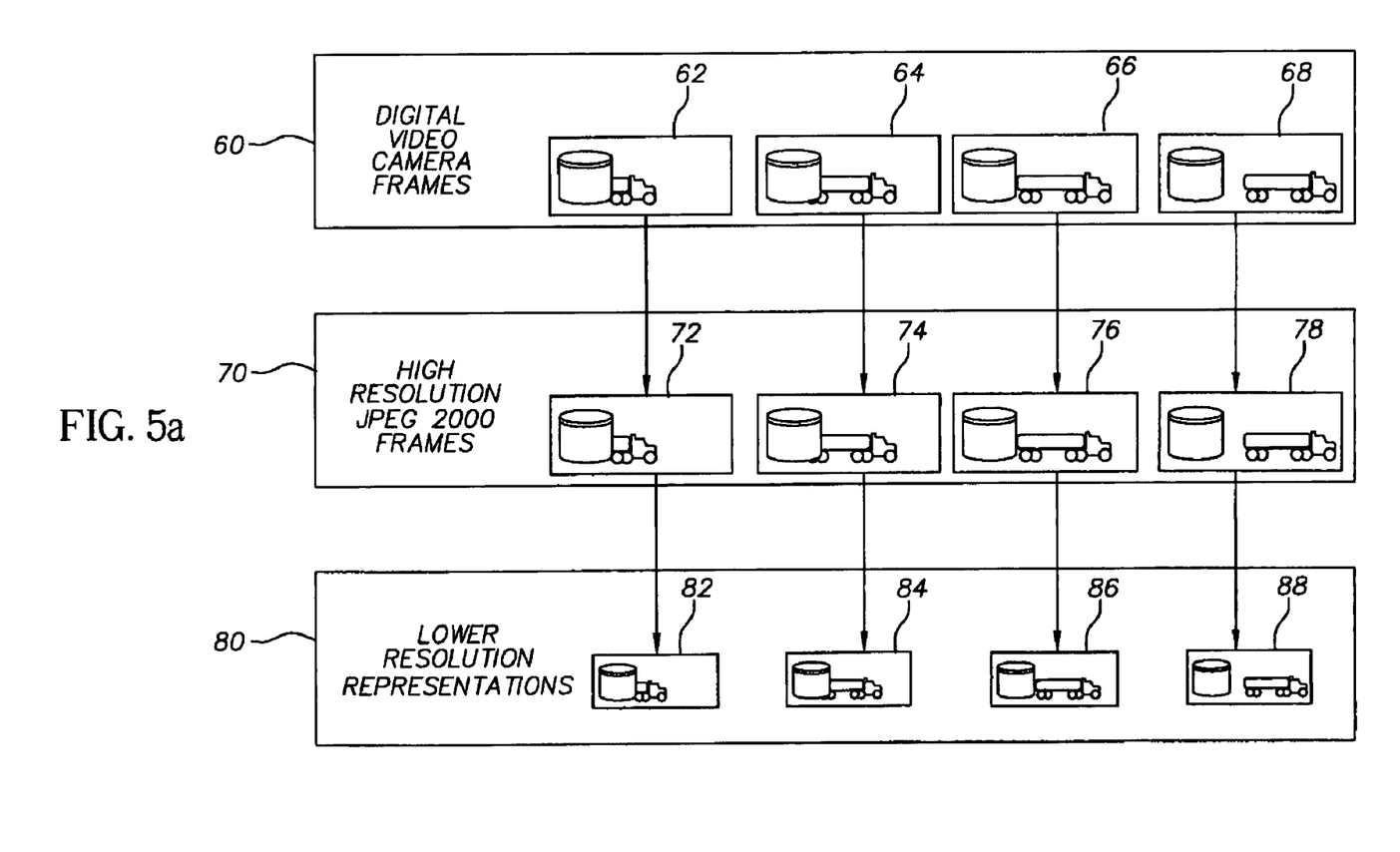
FIG. 5a is a system diagram of a one embodiment of a subsystem of the system of FIG. 1.

Moving on to FIG. 5a, a system diagram shows detail within the capture computer 16 from FIG. 1. An example is illustrated by FIG. 5a wherein live, captured scene 11 comprising of a fuel tanker truck departing from a fuel depot storage tank is captured by digital video camera 10. The digital video camera frames 60 is the set of individual frames comprising the digital video supplied by digital video camera 12. The figure illustrates an example of four digital video camera frames 62, 64, 66, and 68, but in the true embodiment there is no limit to the number of such frames. The high resolution JPEG 2000 frames 70 is the set of individual JPEG 2000 frames created from the digital video camera frames 60. The figure continues the example by illustrating four high resolution JPEG 2000 frames 72, 74, 76, and 78 corresponding to digital video camera frames 62, 64, 66, and 68, respectively. The lower resolution representations 80 is the set of individual lower resolution representations 82, 84, 86, and 88 corresponding to the high resolution JPEG 2000 frames 72, 74, 76, and 78, respectively, at a reduced resolution, with each representation having been generated from a single high resolution JPEG 2000 frame 72, 74, 76, or 78. As with digital video camera frames 60, there is no limit to the number of either high resolution JPEG 2000 frames 70 or lower resolution representations 80. In the example shown in FIG. 5a, such frames are limited in number to four, solely due to practical considerations of this document and such limitation does not extend to the present invention.

Figure 5B:
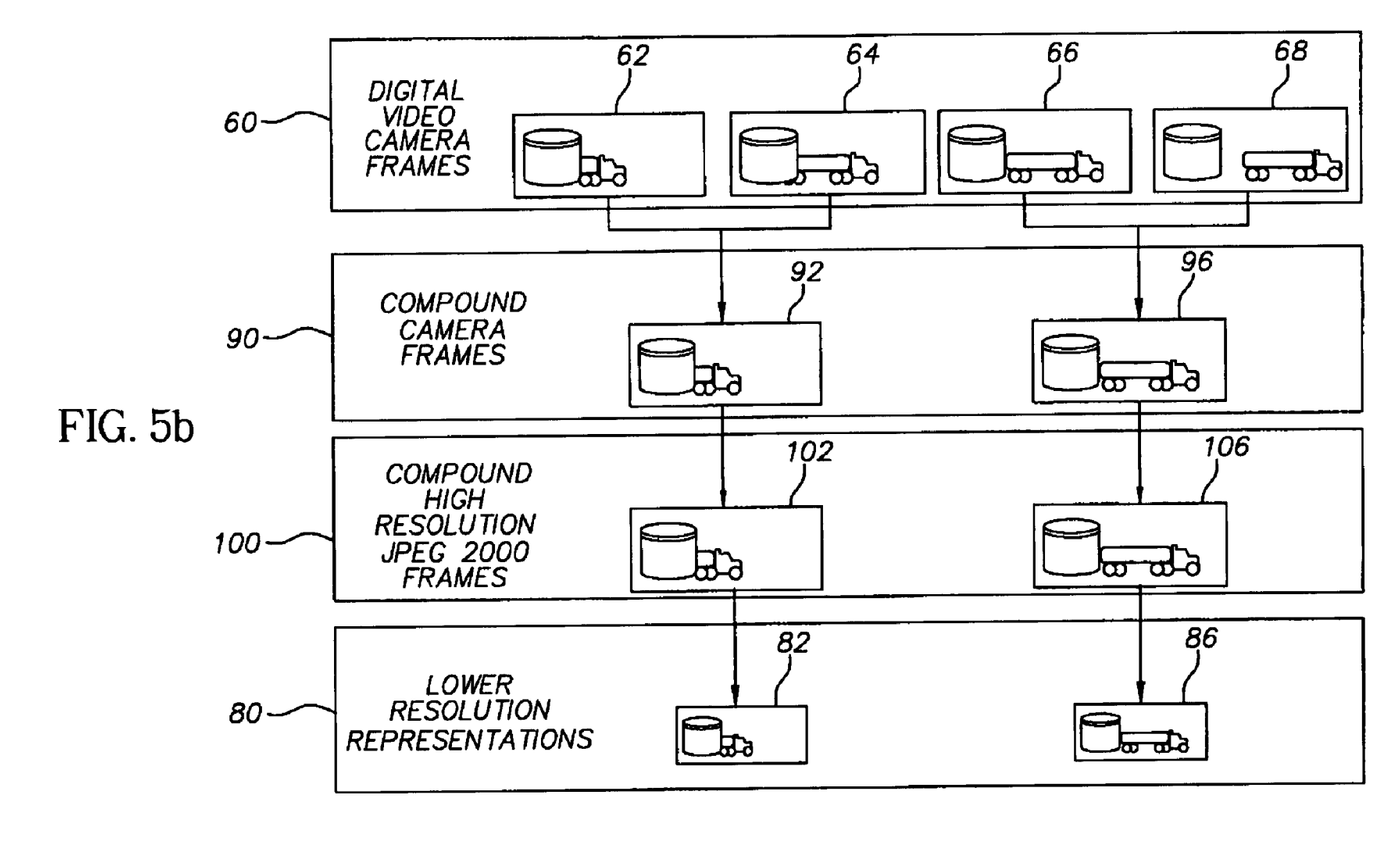
FIG. 5b is a system diagram of an alternate embodiment of a subsystem of the system of FIG. 1.

An alternate embodiment is shown in FIG. 5b, a system diagram of detail within capture computer 16 in which the relationship between digital video camera frames 60 and lower resolution representations 80 is not one-to-one as shown in FIG. 5a, but is many to one, with the illustrated example showing a two-to-one relationship. FIG. 5b is similar to FIG. 5a in many respects, with identically labeled items being identical in nature and function. The compound camera frames 90 is the set of individual compound camera frames 92 and 96. Digital video camera frames 60 are processed into compound camera frames 90 using a many-to-one relationship, which are then processed using a one-to-one relationship into compound high resolution JPEG 2000 frames 100, which is the set of individual compound high resolution JPEG 2000 frames 102 and 106. In the illustrated example, two digital video camera frames 62 and 64 are combined to produce a single compound camera frame 92, as are digital video camera frames 66 and 68 combined to produce compound camera frame 96. Compound high resolution JPEG 2000 frame 102 is then generated from compound camera frame 92, as is compound high resolution JPEG 2000 frame 106 generated from compound camera frame 96. Lower resolution representation 82 is created from compound high resolution JPEG 2000 frame 102 in a manner identical in nature to that used in FIG. 5a, as is lower resolution representation 86 created from compound high resolution JPEG 2000 frame 106. As is the case with FIG. 5a, there is no limit to the number of frames of each type, except that the number of compound camera frames 90, compound high resolution JPEG 2000 frames 100, and lower resolution representations 80 will be N/X where N is the number of digital video camera frames 60 and X is the number of digital video camera frames 60 that are combined to produce each compound camera frame 90. The example illustrated in FIG. 5b shows a value of two for X, meaning two digital video camera frames 60 are combined to produce one compound camera frame 90, and four for N, but this is for illustrative purposes only. This same embodiment may be used to combine any number of digital video camera frames 60 into a single compound camera frame 90. Furthermore, the specific ratio of digital video camera frames 60 to compound camera frames 90 may be automatically or manually varied by the capture computer 16 to optimize the resulting image information. Automated analysis of the digital video camera frames 60, compound camera frames 90, and/or compound high resolution JPEG 2000 frames 100 may be used to detect conditions under which changing the ratio would result in improved image data, reduced image data size, increased response time, or other advantage. Common user interface methods as found in the art may be used to allow the user to alter this ratio manually.

Figure 5C:
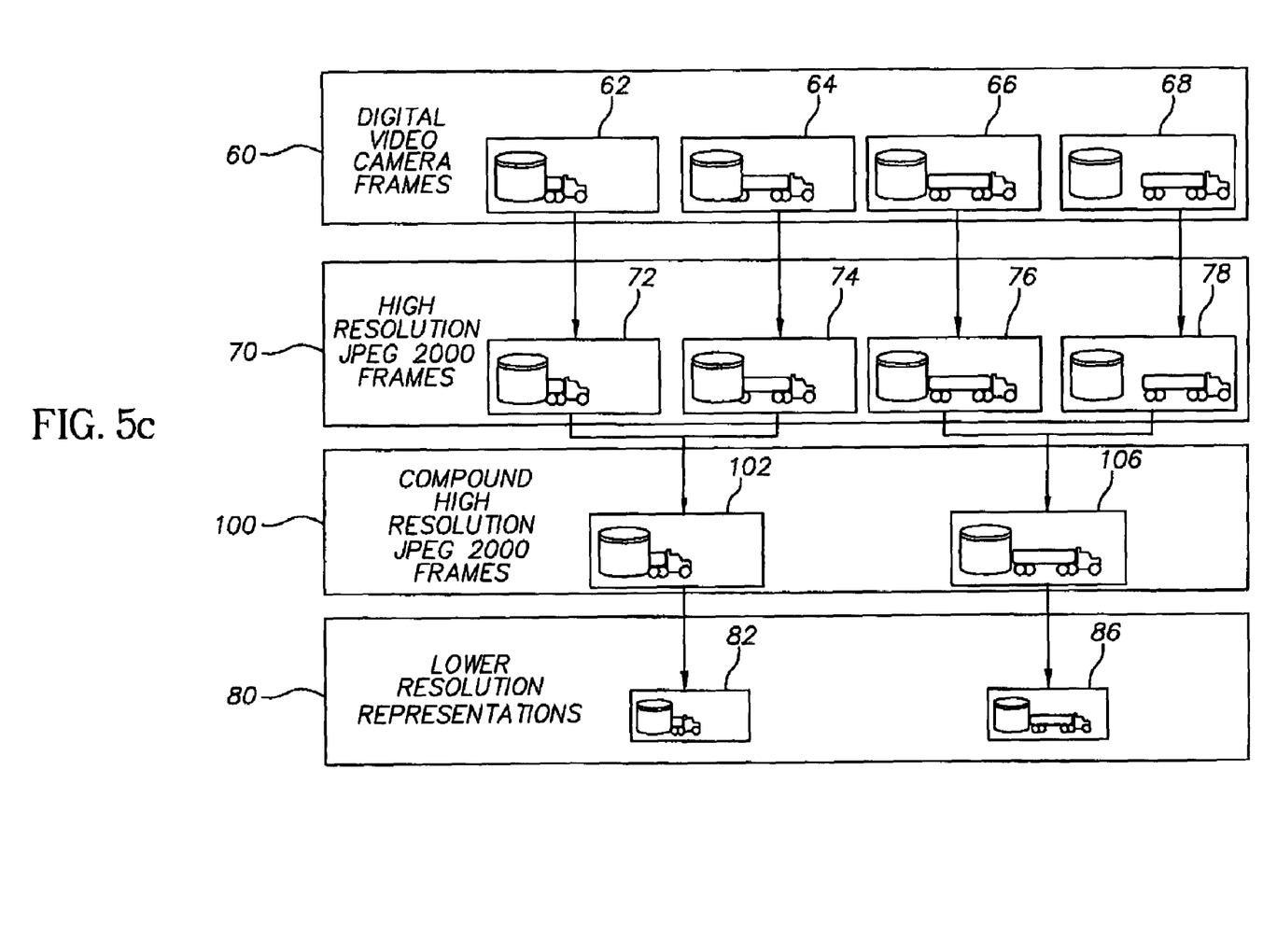
FIG. 5c is a system diagram of an additional alternate embodiment of a subsystem of the system of FIG. 1.

A second alternate embodiment is shown in FIG. 5c, a system diagram of detail within capture computer 16 which is similar to FIG. 5a in many respects, with identically labeled items being identical in nature and function. However, as with FIG. 5b, the ratio of digital video camera frames 60 to lower resolution representations 80 is many-to-one. The compound high resolution JPEG 2000 frames 100 is the set of individual compound high resolution JPEG 2000 frames 102 and 106. High resolution JPEG 2000 frames 70 are processed into compound high resolution JPEG 2000 frames 100 using a many-to-one relationship, which are then processed into lower resolution representations 80. In the illustrated example, two high resolution JPEG 2000 frames 72 and 74 are combined to produce a single compound high resolution JPEG 2000 frame 102, as are high resolution JPEG 2000 frames 76 and 78 combined to produce compound high resolution JPEG 2000 frame 106. Lower resolution representation 82 is created from compound high resolution JPEG 2000 frame 102 in a manner identical in nature to that used in FIG. 5a, as is lower resolution representation 86 created from compound high resolution JPEG 2000 frame 106. As is the case with FIG. 5a and FIG. 5b, there is no limit to the number of frames of each type, except that the number of compound high resolution JPEG 2000 frames 100 and lower resolution representations 80 will be N/X where N is the number of digital video camera frames 60 and X is the number of high resolution JPEG 2000 frames 70 that are combined to produce each compound high resolution JPEG 2000 frame 100. The example illustrated in FIG. 5c shows a value of two for X, meaning two high resolution JPEG 2000 frames 70 are combined to produce one compound high resolution JPEG 2000 frame 100, and four for N, but this is for illustrative purposes only. This same embodiment may be used to combine any number of high resolution JPEG 2000 frames 70 into a single compound high resolution JPEG 2000 frame 100. Furthermore, the specific ratio of high resolution JPEG 2000 frames 70 to compound high resolution JPEG 2000 frames 100 may be automatically or manually varied by the capture computer 16 to optimize the resulting image information. Automated analysis of the digital video camera frames 60, high resolution JPEG 2000 frames 70, and/or compound high resolution JPEG 2000 frames 100 may be used to detect conditions under which changing the ratio would result in improved image data, reduced image data size, increased response time, or other advantage. Common user interface methods as found in the art may be used to allow the user to alter this ratio manually.

Figure 6A:
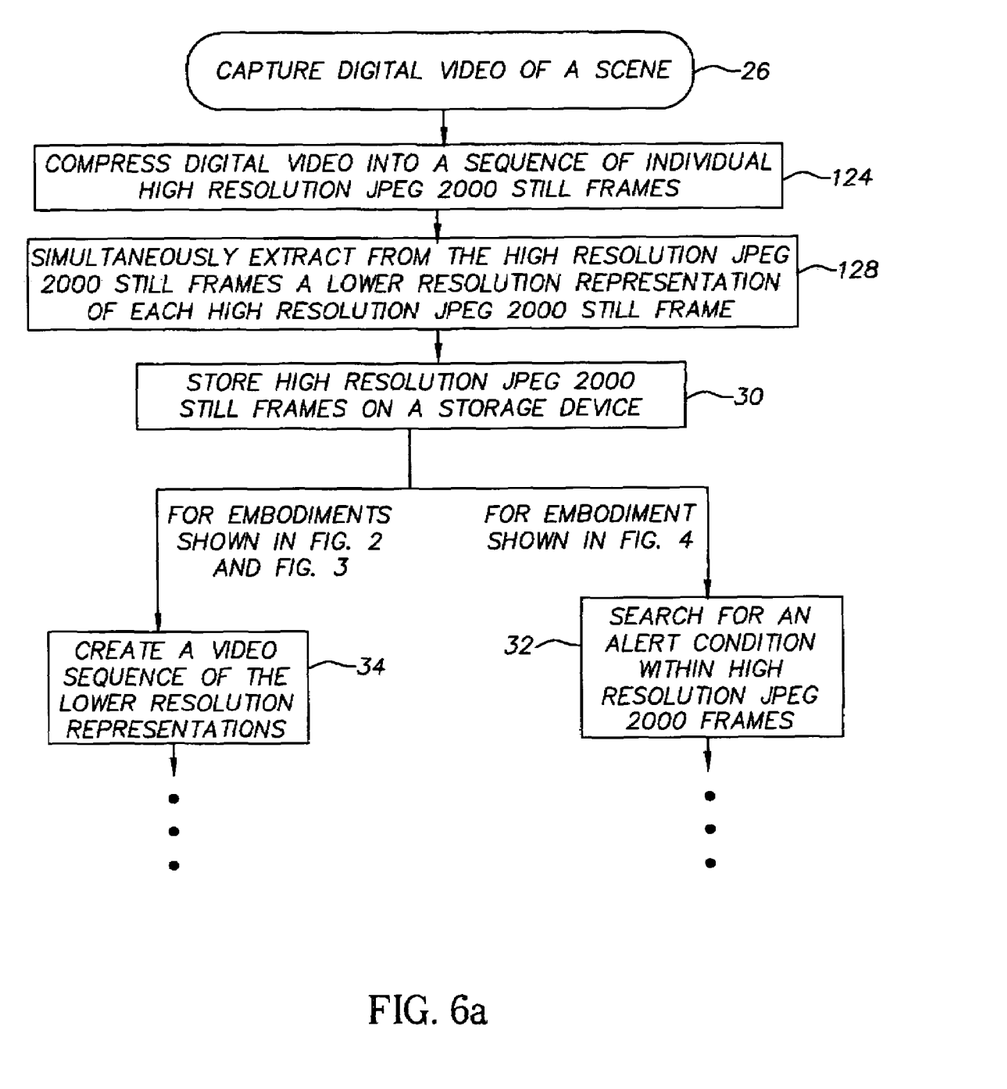

Turning to FIG. 6a, a flow chart illustrates the operation of capture computer 16 as shown earlier in FIG. 5a, and expands step 28 from FIGS. 2-4 into steps 124 and 128 while using steps 26, 30, 32, and 34 identical to those from FIGS. 2-4. Beginning with step 26, digital video is captured by digital video camera 12 and delivered to capture computer 16. In step 124 each digital video camera frame 60 from digital video camera 12 is processed and compressed by capture computer 16 into a high resolution JPEG 2000 frame 70. In step 128 a lower resolution representation 80 is created by capture computer 16 from each high resolution JPEG 2000 frame 70. Steps 30, 32, and 34 are identical in nature and purpose to the same labeled steps in FIGS. 2-4, after which processing proceeds as described for FIGS. 2-4, joining the operational flow at step 34 (in the case of FIG. 2 and FIG. 3) or at step 32 (in the case of FIG. 4). The example illustrated in FIG. 5a would flow as follows: digital video camera frame 62 is processed in step 124 into high resolution JPEG 2000 frame 72, which is processed in step 128 into lower resolution representation 82 and stored in step 30 on storage device 20. Processing continues with step 34 for the embodiments described in FIG. 2 or FIG. 3, or with step 32 for the embodiment described in FIG. 4. All digital video camera frames 60 would be processed in this fashion resulting in high resolution JPEG 2000 frames 70 and lower resolution representations 80.

Figure 6B:
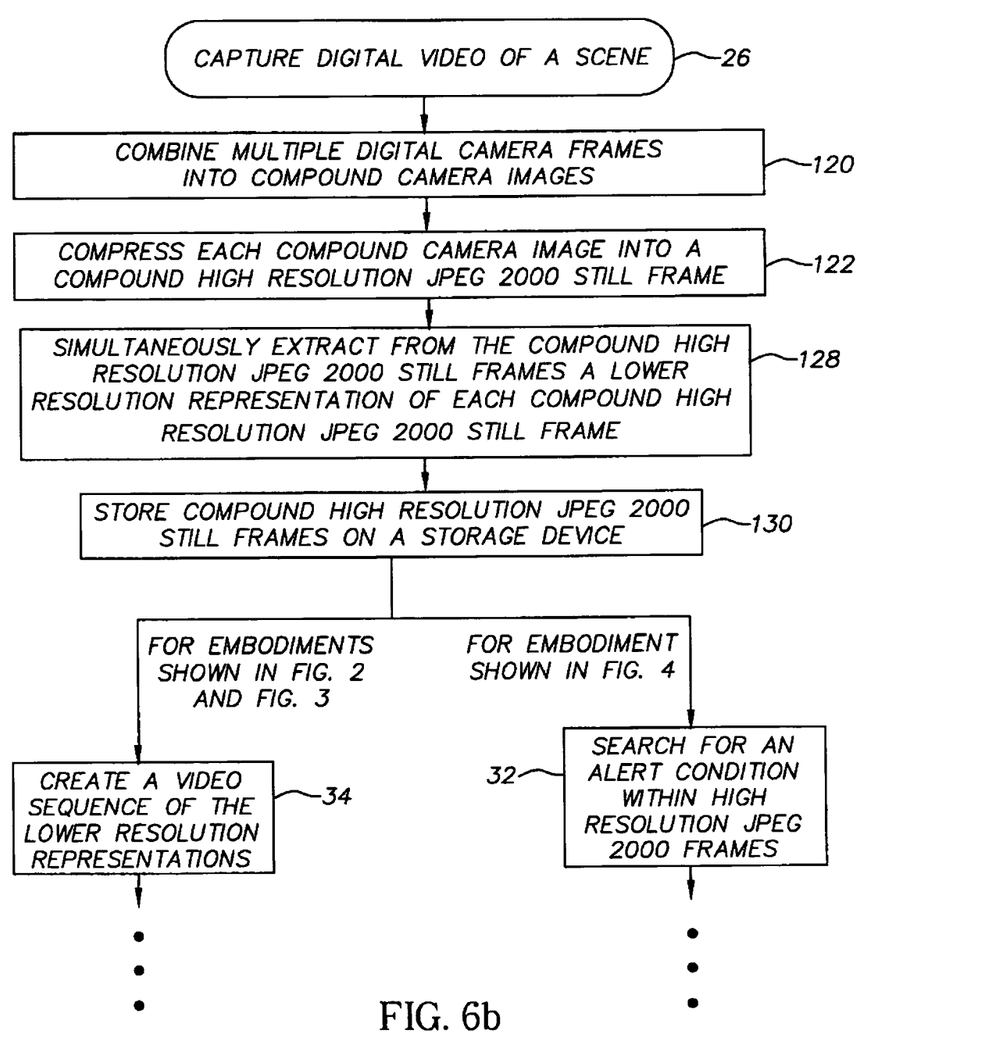
FIG. 6b is a flow chart of the operation of the subsystem of FIG. 5b.

FIG. 6b is a flow chart illustrating the operation of capture computer 16 as shown earlier in FIG. 5b, and expands step 28 from FIGS. 2-4 into steps 120, 122, 128, and 130 while using steps 26, 32, and 34 identical to those from FIGS. 2-4. Beginning with step 26, digital video is captured by digital video camera 12 and delivered to capture computer 16. In step 120 some number, for example two, of digital video camera frames 60 from digital video camera 12 are combined by capture computer 16 into a single compound camera frame 90 using frame averaging, frame stacking, or any other such frame combination method commonly known in the art. Each compound camera frame 90 is processed and compressed in step 122 by capture computer 16 into a compound high resolution JPEG 2000 frame 100. Step 128 is identical in nature and purpose to the identically labeled step from FIG. 6a. In step 130 compound high resolution JPEG 2000 frames 100 are stored on storage device 20. Processing continues with step 34 (as described for FIG. 2 and/or FIG. 3) or step 32 (as described for FIG. 4). The example illustrated in FIG. 5b would flow as follows: digital video camera frames 62 and 64 are combined in step 120 into compound camera frame 92, which is processed in step 122 into compound high resolution JPEG 2000 frame 102, which is in turn processed in step 128 into lower resolution representation 82 and stored in step 130 on storage device 20. Processing continues with step 34 for the embodiments described in FIG. 2 or FIG. 3, or with step 32 for the embodiment described in FIG. 4. Digital video camera frames 66 and 68 are processed in the same fashion to produce compound camera frame 96, compound high resolution JPEG 2000 frame 106, and lower resolution representation 86. Each pair of digital video camera frames 60 would be processed in this fashion resulting in compound camera frames 90, compound high resolution JPEG 2000 frames 100, and lower resolution representations 80. The specific number of digital video camera frames 60 that are combined to form compound camera frames 90 may be any number, and that number may be automatically or manually altered during operation of capture computer 16 to optimize image quality, image size, response time and/or other advantage. This ratio may be dynamically altered based upon analysis of the incoming data as well as other inputs commonly known in the art. Automated analysis of the digital video camera frames 60, compound camera frames 90, and/or compound high resolution JPEG 2000 frames 100 may be used to detect conditions under which changing the ratio would result in improved image data, reduced image data size, increased response time or other advantage. Common user interface methods as found in the art may be used to allow the user to alter this ratio manually.

Figure 6C:
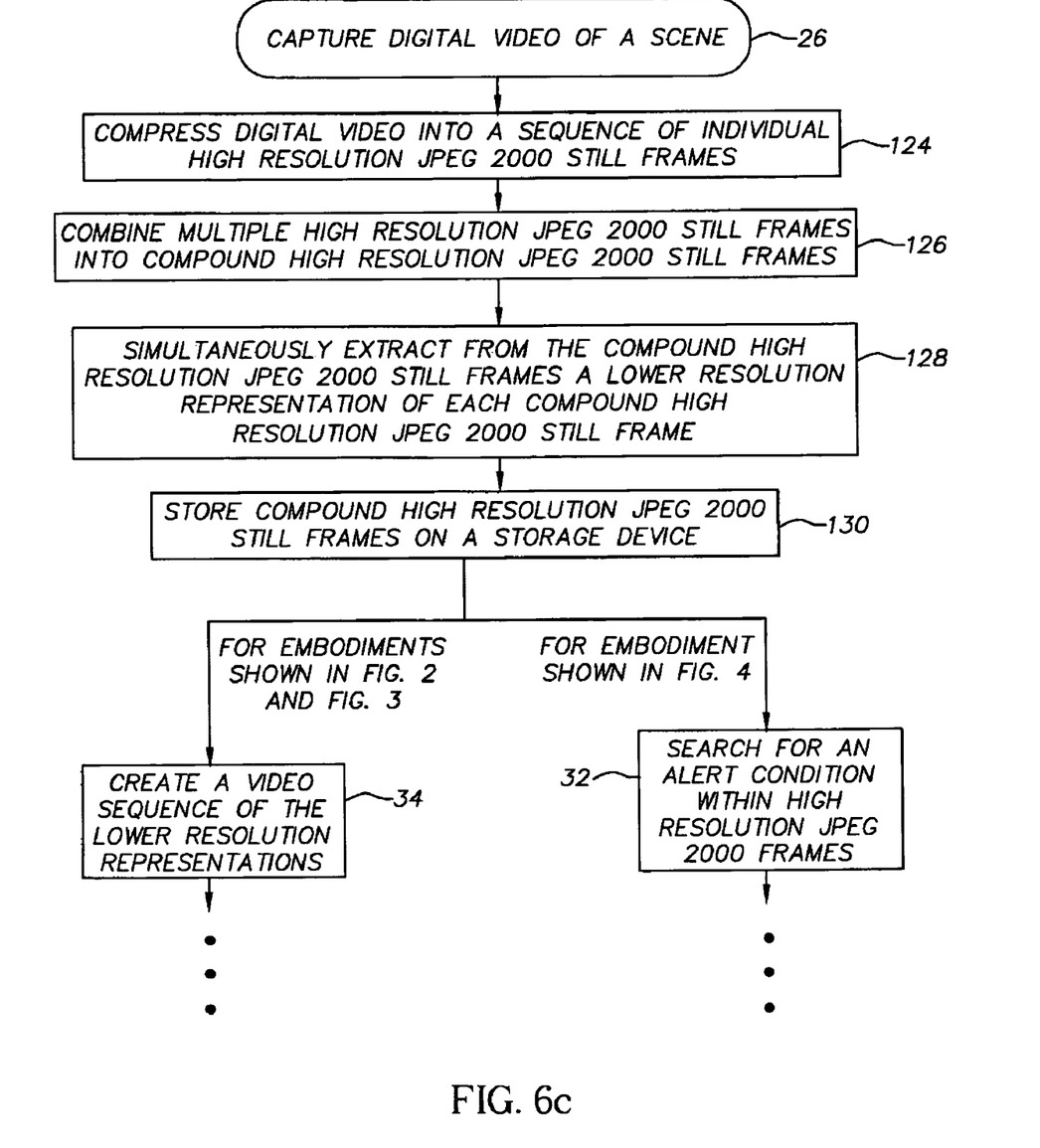
FIG. 6c is a flow chart of the operation of the subsystem of FIG. 5c.

FIG. 6c is a flow chart illustrating the operation of capture computer 16 as shown earlier in FIG. 5c, and expands step 28 from FIG. 2-4 into steps 124, 126, and 128 while using steps 26, 32, and 34 identical to those from FIGS. 2-4. Step 124 is identical in nature and purpose to the identically labeled step from FIG. 6a. In step 126 some number, for example two, of high resolution JPEG 2000 frames 70 are combined by capture computer 16 into a single compound high resolution JPEG 2000 frame 100 using frame averaging, frame stacking, or any other such frame combination method commonly known in the art. Each compound high resolution JPEG 2000 frame 100 is used in step 128 by capture computer 16 to create a corresponding lower resolution representation 80, then the compound high resolution JPEG 2000 frame is stored in step 130 on storage device 20. Processing continues with step 34 (as described for FIG. 2 and/or FIG. 3) or step 32 (as described for FIG. 4) and joins the rest of the operational flow as described in FIGS. 2-4. The example illustrated in FIG. 5c would flow as follows: digital video camera frames 62 and 64 are processed and compressed into high resolution JPEG 2000 frames 72 and 74 by capture computer 16 in step 124, which are then combined in step 126 into compound high resolution JPEG 2000 frame 102. Compound high resolution JPEG 2000 frame 102 is then used to create lower resolution representation 82 in step 128 and stored on storage device 20 in step 130. Processing continues with step 34 for the embodiments described in FIG. 2 or FIG. 3, or with step 32 for the embodiment described in FIG. 4. Digital video camera frames 66 and 68 are processed in the same fashion to produce high resolution JPEG 2000 frames 76 and 78, compound high resolution JPEG 2000 frame 106, and lower resolution representation 86. Each pair of digital video camera frames 60 would be processed in this fashion resulting in high resolution JPEG 2000 frames 70, compound high resolution JPEG 2000 frames 100, and lower resolution representations 80. The specific number of high resolution JPEG 2000 frames 70 that are combined to form compound high resolution JPEG 2000 frames 100 may be any number, and that number may be automatically altered during operation of capture computer 16 to optimize image quality, image size, response time and/or other advantage. This dynamic ratio may be altered based upon analysis of the incoming data as well as other inputs commonly known in the art. Automated analysis of the digital video camera frames 60, high resolution JPEG 2000 frames 70, and/or compound high resolution JPEG 2000 frames 100 may be used to detect conditions under which changing the ratio would result in improved image data, reduced image data size, increased response time, or other advantage. Common user interface methods as found in the art may be used to allow the user to alter this ratio manually.

The invention has been described with reference to one or more embodiments; however, it will be appreciated that variations and modifications can be effected by a person of ordinary skill in the art without departing from the scope of the invention.

PARTS LIST 10 selective digital video transmission system
11 captured scene
12 digital video camera
14 integrated capture unit
16 capture computer
20 storage device
22 communications network
24 user computer
26 process step
28 process step
30 process step
32 process step
33 decision step
34 process step
36 process step
37 process step
38 process step
40 process step
42 process step
60 digital video camera frames
62 individual digital video camera frame
64 individual digital video camera frame
66 individual digital video camera frame
68 individual digital video camera frame
70 high resolution JPEG 2000 frames
72 individual high resolution JPEG 2000 frame
74 individual high resolution JPEG 2000 frame
76 individual high resolution JPEG 2000 frame
78 individual high resolution JPEG 2000 frame
80 lower resolution representations
82 individual lower resolution representation
84 individual lower resolution representation
86 individual lower resolution representation
88 individual lower resolution representation
90 compound camera frames
92 individual compound camera frame
96 individual compound camera frame
100 compound high resolution JPEG 2000 frames 102 individual compound high resolution JPEG 2000 frame
106 individual compound high resolution JPEG 2000 frame
120 process step
122 process step
124 process step
128 process step
130 process step
400 decision step
402 process end step
404 process step

What is claimed is:

1. A method of transmitting selected regions of interest of digital video data at selected resolutions, comprising the steps of:
   a) capturing digital video;
   b) compressing the digital video into a sequence of individual high resolution frames and simultaneously extracting from the compressed high resolution frames a lower resolution representation of each of the individual high resolution frames;
   c) storing the individual high resolution frames in a storage device;
   d) creating a video sequence of the lower resolution representation of each of the stored individual high resolution frames;
   e) transmitting the video sequence of the lower resolution representation of each of the stored individual high resolution frames to a user;
   f) creating one or more video sequences of selected regions of interest at selected resolutions greater than the resolution of the video sequence of the lower resolution representation;
   g) transmitting one or more video sequences of selected regions of interest at selected resolutions; and
   h) repeating steps (f) and (g) at incrementally increased resolutions until a desired resolution of the selected region of interest is reached according to a viewing objective.

2. The method claimed in claim 1, wherein the user selects the regions of interest and the selected resolution.

3. The method claimed in claim 1, wherein selection of the regions of interest and the selected resolution is initiated by an automated process.

4. The method claimed in claim 1, wherein capturing digital video includes real time digital video.

5. The method claimed in claim 1, wherein steps (d) through (h) are deferred until a transmission medium is available.

6. The method claimed in claim 1, wherein the selected resolutions greater than the resolution of the video sequence of the lower resolution representation correspond to a factor of two.

7. The method claimed in claim 1, wherein the video sequence of the lower resolution representation is compressed with an MPEG family of standards.

8. The method claimed in claim 1, wherein the video sequence of the lower resolution representation is compressed with a Motion JPEG 2000 standard.

9. The method claimed in claim 1, wherein the video sequence of the lower resolution representation is compressed with a video coding technique.

10. A method of transmitting selected regions of interest of digital video data and/or still imagery data at selected resolutions, comprising the steps of:
    a) capturing digital video;
    b) compressing the digital video into a sequence of individual high resolution frames and simultaneously extracting from the compressed high resolution frames a lower resolution representation of each of the individual high resolution frames;
    c) storing the individual high resolution frames in a storage device;
    d) creating a video sequence of the lower resolution representation of each of the stored individual high resolution frames;
    e) transmitting the video sequence of the lower resolution representation of each of the stored individual high resolution frames to a user;
    f) creating one or more high resolution still frames by extracting one or more regions of interest at selected resolutions from the stored individual high resolution frames;
    g) creating one or more video sequences of selected regions of interest at selected resolutions greater than the resolution of the video sequence of the lower resolution representation;
    h) transmitting one or more video sequences of selected regions of interest at selected resolutions and/or one or more of the high resolution still frames created in step (f); and
    i) repeating steps (f) through (h) at incrementally increased resolutions until a desired resolution of the selected region of interest is reached according to a viewing objective.

11. The method claimed in claim 10, wherein the user selects the regions of interest and the selected resolution.

12. The method claimed in claim 10, wherein selection of the regions of interest and the selected resolution is initiated by an automated process.

13. The method claimed in claim 10, wherein the video sequence of the lower resolution representation is compressed with an MPEG family of standards.

14. The method claimed in claim 10, wherein the video sequence of the lower resolution representation is compressed with a Motion JPEG 2000 standard.

15. The method claimed in claim 10, wherein the video sequence of the lower resolution representation is compressed with a video coding technique.

16. The method claimed in claim 10, wherein the extracted regions of interest at selected resolution are in JPEG 2000 format.

17. The method claimed in claim 16, wherein the extracted regions of interest at selected resolution are transmitted using JPIP protocol.

18. The method claimed in claim 10, wherein capturing digital video includes real time digital video.

19. The method claimed in claim 10, wherein steps (d) through (i) are deferred until a transmission medium is available.

20. The method claimed in claim 10, wherein the selected resolutions greater than the resolution of the video sequence of the lower resolution representation correspond to a factor of two.

21. A method of transmitting selected regions of interest of digital video data at selected resolutions, comprising the steps of:
    a) capturing digital video;
    b) compressing the digital video into a sequence of individual high resolution frames and simultaneously extracting from the compressed high resolution frames a lower resolution representation of each of the individual high resolution frames;
    c) storing the individual high resolution frames in a storage device;

d) searching for an alert condition within the sequence of individual high resolution frames;
e) repeating steps (a) through (d) until capturing of the digital video ends;
f) creating a video sequence of the lower resolution representation of each of the stored individual high resolution frames upon finding the alert condition;
g) transmitting the video sequence of the lower resolution representation of each of the stored individual high resolution frames to a user upon finding the alert condition;
h) creating one or more video sequences of selected regions of interest at selected resolutions greater than the resolution of the video sequence of the lower resolution representation upon finding the alert condition;
i) transmitting one or more video sequences of selected regions of interest at selected resolutions upon finding the alert condition; and
j) repeating steps (h) and (i) at incrementally increased resolutions until a desired resolution of the selected region of interest is reached according to a viewing objective, upon finding the alert condition.

22. The method claimed in claim 21, wherein the user selects the regions of interest and the selected resolution.

23. The method claimed in claim 21, wherein selection of the regions of interest and the selected resolution is initiated by an automated process.

24. The method claimed in claim 21, wherein capturing digital video includes real time digital video.

25. The method claimed in claim 21, wherein steps (f) through (j) are deferred until a transmission medium is available.

26. The method claimed in claim 21, wherein the selected resolutions greater than the resolution of the video sequence of the lower resolution representation correspond to a factor of two.

27. The method claimed in claim 21, wherein the video sequence of the lower resolution representation is compressed with an MPEG family of standards.

28. The method claimed in claim 21, wherein the video sequence of the lower resolution representation is compressed with a Motion JPEG 2000 standard.

29. The method claimed in claim 21, wherein the video sequence of the lower resolution representation is compressed with a video coding technique.

* * * * *